(12) United States Patent
Ichimura et al.

(10) Patent No.: US 6,307,689 B1
(45) Date of Patent: Oct. 23, 2001

(54) OPTICAL HEAD AND DRIVE DEVICE FOR OPTICAL RECORDING MEDIUM

(75) Inventors: Isao Ichimura; Koichiro Kishima; Kenji Yamamoto; Kiyoshi Osato, all of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/581,987

(22) PCT Filed: Oct. 21, 1999

(86) PCT No.: PCT/JP99/05813

§ 371 Date: Aug. 17, 2000

§ 102(e) Date: Aug. 17, 2000

(87) PCT Pub. No.: WO00/23991

PCT Pub. Date: Apr. 27, 2000

(30) Foreign Application Priority Data

Oct. 21, 1998 (JP) .................................................. 10-299956

(51) Int. Cl.[7] ............................ G02B 7/02; G11B 27/10; G11B 7/00; G11B 7/135
(52) U.S. Cl. ........................ 359/823; 369/43; 369/112.24
(58) Field of Search .................................... 359/813, 814, 359/823, 824, 819; 369/44.14, 43, 112.24; 385/124

(56) References Cited

U.S. PATENT DOCUMENTS

| | | |
|---|---|---|
| 5,004,307 | 4/1991 | Kino ..................................... 359/356 |
| 5,729,393 | 3/1998 | Lee ....................................... 359/819 |
| 5,920,140 * | 7/1999 | Nakagishi et al. .................... 310/219 |
| 5,939,709 | 8/1999 | Ghislain et al. ...................... 250/216 |

FOREIGN PATENT DOCUMENTS

| | | | |
|---|---|---|---|
| 6-267091 | 9/1994 | (JP) | ................. G11B/7/09 |
| 8-212579 | 8/1996 | (JP) | ............... G11B/7/135 |
| 10-188333 | 7/1998 | (JP) | ............... G11B/7/135 |
| WO97/41556 | 11/1997 | (WO) | ................ G11B/7/12 |

* cited by examiner

*Primary Examiner*—Ricky Mack
(74) *Attorney, Agent, or Firm*—Oblon, Spivak, McClelland, Maier & Neustadt, P.C.

(57) ABSTRACT

An optical head (1) having an optical means for focusing a laser beam to irradiate an optical recording medium (51) is equipped with an objective lens (2) focusing a laser beam L, and a solid immersion lens (3) disposed between the objective lens (2) and the optical recording medium (51), the head comprising a holder member (4) for integrally retaining the lenses (2) and (3) and a moving mechanism (5*a*) for moving the holder member in a direction along an optical axis of the lenses (2) and (3), wherein an electrically conductive material is used on a surface of the optical head facing the optical recording medium (51). The numerical aperture can be made large by the solid immersion lens (3). Moreover, the air gap can be controlled with high precision according to the electrostatic capacity formed between the electrically conductive material and the optical recording medium (51). Furthermore, the moving mechanism (5*a*) and the signal processing for the focus servo operation can be made simpler.

7 Claims, 7 Drawing Sheets

38

1

OPTICAL HEAD AND DRIVE DEVICE FOR OPTICAL RECORDING MEDIUM

TECHNICAL FIELD

The present invention belongs to a technical field for recording information and reproducing it using an optical recording medium. Particularly, the invention relates to what is suitably used for achieving high-density recording by increasing the numerical aperture of an objective lens for focusing a laser beam.

BACKGROUND ART

In recent years, there has been a demand for increasing the recording density of a rewritable disc such as a phase-change type optical disc or a magneto-optical disc in order to enable recording a large amount of data such as moving-video data without increasing the diameter of the disc. This increase in recording density is realized by making small of the spot size of a laser beam irradiating a signal-recording surface of the optical disc.

It is known that the spot size (d) in the order near the wavelength λ of the laser beam, according to the Fourier image formation theory, can be determined from the wavelength λ and the numerical aperture NA of the objective lens for focusing the laser beam by the following equation (1).

$$d = 1.22 \cdot \lambda / NA \tag{1}$$

Accordingly, the shorter the wavelength of the laser beam is and the greater the numerical aperture of the objective lens is, the smaller the spot size becomes. This makes it possible to increase the recording density.

As a method of increasing the numerical aperture, there is known a method using a solid immersion lens.

Stating in terms of its principle, as illustrated in FIG. 1A, this method disposes, between an objective lens 61 and an optical disc 62, a solid immersion lens (SIL) 63 whose surfaces facing the objective lens 61 and optical disc 62 are a spherical surface 63a and a flat surface 63b, respectively and causes a laser beam L having passed through the objective lens 61 to vertically enter the spherical surface 63a of the SIL 63 and to focus on a central portion of the flat surface 63b. Assuming that n represents the refractive index of the SIL 63, the numerical aperture (effective numerical aperture) of a lens group consisting of the objective lens 61 and the SIL 63 becomes n times as great as the numerical aperture of the objective lens 61 itself.

However, the method is actually arranged to cause the effective numerical aperture to become as $n^2$ times as great as that of the objective lens 61 by satisfying the conditions of stigmatic focusing as described below. To this end, as illustrated in FIG. 1B, the method causes the laser beam L that has passed through the objective lens 61 to enter the spherical surface 63a of the SIL 63 at an incidence angle different from the angle vertical to this spherical surface 63a, thereby causing the laser beam L to be somewhat refracted by the spherical surface 63a.

In, for example, S. M. Mansfield et al's thesis entitled "High-numerical-aperture lens system for optical storage", carried on pages 305 to 307 of "Optics Letter" the 18th issue, published in 1993 (hereinafter called "reference literature no. 1"), H. J. Mamin et al's thesis entitled "Near-field optical data storage", carried on pages 141 to 143 of "Applied Physics Letter" the 68th issue, published in 1996 (hereinafter called "reference literature no. 2"), it is reported that by the method using the solid immersion lens, the numerical aperture exceeding 1 is realized.

By the way, when the numerical aperture exceeds 1 in that way, as the distance (air gap) between the solid immersion lens and the optical disc in a direction along an optical axis of the laser beam increases, the reflectance of a component of the laser beam which corresponds to the optical quantity exceeding 1 of numerical aperture at a flat surface of the solid immersion lens increases. As a result of this phenomenon, the intensity of the laser beam permeating the solid immersion lens and irradiating the optical disc rapidly deteriorates. When this air gap becomes more than the range of the proximity field (nearfield), most of the component corresponding to the optical quantity exceeding 1 of numerical aperture becomes reflected by the flat surface of the solid immersion lens. Therefore, the intensity of the laser beam irradiating the optical disc becomes remarkably low.

In order to represent this specifically, FIG. 2 is made regarding each case for the air gap of 0 nm, 50 nm, 100 nm, 200 nm and 500 nm as follows. The distance on the signal-recording surface of the optical disc as measured from the center of the spot of the laser beam is plotted on the abscissa axis. In contrast, the intensity of the laser beam irradiating this signal-recording surface (as expressed in terms of the ratio to the intensity of the laser beam at the spot center thereof when the air gap is 0 nm) is plotted on the ordinate axis. FIG. 2 shows the calculated values of the intensity distribution (Strehl intensity) of the laser beam on the signal-recording surface when the numerical aperture NA=1.5 and the wavelength λ=640 nm.

FIG. 2 shows the following. When the air gap is 50 nm, the intensity of the laser beam at the center of the spot is to an extent of 85% of the intensity exhibited when the air gap is 0 nm. However, when the air gap increases up to 100 nm, the resulting intensity becomes approximately 60% of the intensity when the air gap is 0 nm. When the air gap reaches 200 nm, the resulting intensity falls down to approximately 35% of the intensity when the air gap is 0 nm.

Therefore, where the numerical aperture exceeds 1, control should be performed so as to make the air gap sufficiently small (in the case of the example illustrated in FIG. 2, so as to keep the air gap fall within the range of 100 nm or less at the maximum, or preferably 50 nm or so). Otherwise, due to the fall in the intensity of the laser beam irradiating the signal-recording surface of the optical disc, the recording precision and the reproduction precision will disadvantageously deteriorate.

As the method of controlling so as to make the air gap small, there is also a method in which the optical head having an objective lens and solid immersion lens installed therein is floated from the optical disc by the air current involved by the rotation thereof as in the case of the magnetic head of a hard-disc device.

However, by this method, the intensity of the air current depends on the linear velocity of the optical disc, so that, for example, in the case of a CAV (constant-angular-velocity recording) system, as the irradiating position of the laser beam in the radial direction of the disc changes (i.e., as the track to be accessed changes), the amount of floating of the head inconveniently changes. In the case of a CLV (constant-linear-velocity recording) system also, the amount of floating differs between optical disc devices whose linear velocities differ from each other. As a result, this method is difficult to control the air gap with high precision.

In view of the above, the applicant of this patent application already filed in Japanese Patent Office (Japanese Patent Application Laid-Open No. 8-212579) a patent application for an invention concerning an optical head and a driving apparatus for an optical recording medium. This previous invention is arranged to retain an objective lens and a solid immersion lens by respective separate holders and use electrically conductive material in the holder for retaining the solid immersion lens, thereby causing the control of the position in the direction along an optical axis of the solid immersion lens in accordance with the electrostatic capacity (capacitor) formed with this electrically conductive material to be performed independently of the control of the distance in the direction along the optical axis between the objective lens and the optical disc. According to this previous invention, it is possible to control the air gap with high precision regardless of the linear velocity of the optical disc.

However, in this previous invention proposed by the present applicant, two actuators are necessary as an actuator for moving the lens in the optical-axial direction for the purpose of a focus servo. One is an actuator for moving the holder having the solid immersion lens retained thereby and the other is an actuator for moving the holder having the objective lens retained thereby.

Also, as the signal processing for producing a control signal for focus servo, two kinds of signal processing are necessary. One is the signal processing for producing a control signal that is intended to control the position of the solid immersion lens in accordance with the electrostatic capacity. The other is the signal processing for producing a control signal intended to control the distance between the objective lens and the optical disc (e.g. the matrix processing of the output signal of a photo-detector having received a laser beam reflected from the optical disc).

Therefore, the present invention has an object to provide an optical head and a driving apparatus for an optical recording medium, which are capable of making the numerical aperture greater with a solid immersion lens, controlling the air gap according to the electrostatic capacity with high precision, and also making simpler of the actuator and the signal processing for focus servo.

DISCLOSURE OF THE INVENTION

An optical head according to the present invention, as described in claim 1, is characterized by comprising a holder member for retaining an optical means having the function of an objective lens focusing a laser beam to irradiate an optical recording medium and an optical means having the function of a solid immersion lens disposed between the objective lens and the optical recording medium while keeping a fixed distance between the objective lens and the solid immersion lens, and a moving mechanism for moving the holder member in a direction along an optical axis of the laser beam, wherein an electrically conductive member is used on a surface of the optical head facing the optical recording medium.

In this optical head, the optical means having the function of an objective lens and optical means having the function of a solid immersion lens are integrally retained by one holder member with the distance between the objective lens and the solid immersion lens being kept fixed. This holder member is moved in the optical-axial direction of the laser beam by one moving mechanism. Therefore, the objective lens and the solid immersion lens are moved together in the optical-axial direction by the one moving mechanism as the distance therebetween is kept fixed.

Then, since an electrically conductive material is used on the surface facing the optical recording medium, an electrostatic capacity is formed between this electrically conductive material and the optical recording medium.

Accordingly, in a focus servo system of the driving apparatus for the optical recording medium, when producing a control signal for controlling the distance (air gap) between the solid immersion lens and the optical recording medium as measured in the optical-axial direction, according to the electrostatic capacity, and moving this holder member according to this control signal, with this moving mechanism, the objective lens and the solid immersion lens are simultaneously moved in the optical-axial direction. Consequently, the air gap is controlled with high precision and simultaneously the distance between the objective lens and the optical disc is also controlled with high precision. Thus, the focus servo is realized.

In this way, according to the above optical head, the numerical aperture can be made great (e.g. more than 1) by the solid immersion lens. In addition, the control for making the air gap sufficiently small (e.g. within 100 nm) can be performed with high accuracy according to the electrostatic capacity. Furthermore, since focus servo can be realized with a single moving mechanism (actuator), it is possible to make simpler of the moving mechanism for performing focus servo.

Also, on the side of the focus servo system of the driving apparatus for an optical recording medium, it is possible to realize focus servo with a sort of signal processing based on the electrostatic capacity. This enables to make simpler of the signal processing for the purpose of executing the focus servo.

It is noted that, in this optical head, as stated in claim 2, if a surface facing to the optical recording medium of the solid immersion lens is provided with a protrusion at its central portion, a peripheral portion around the protrusion being made flat, and on this peripheral portion being formed a film made of an electrically conductive material, then an electrostatic capacity is suitably formed between the solid immersion lens itself and the optical recording medium.

As the result, for example, compared to the case where forming the electrostatic capacity, e.g. between the holder member and the optical recording medium, the value of the electrostatic capacity can be increased by making small of the distance between the electrically conductive material and the optical recording medium. Therefore, it will be possible to produce the control signal based on the electrostatic capacity with higher precision.

Also, as illustrated in FIG. 1 as well, because the laser beam passes through the central portion of the surface of the solid immersion lens facing the optical recording medium, the film formed on the peripheral portion of this facing surface will be no obstacle for the laser beam to irradiate the optical recording medium.

Moreover, corresponding to the protrusion of the facing surface at the central portion, the remaining portion of the optical head is retreated away from the optical recording medium. Therefore, even when the entire optical head has been inclined with respect to the optical recording medium, it is less likely that the optical head will contact with the optical recording medium.

Furthermore, in this optical head, as stated in claim 3, it is more preferable that an electrically conductive material is used for the holder member in order to electrically connect the holder member and the electrically conductive film of the peripheral portion of the solid immersion lens.

This makes it possible to detect the value of the electrostatic capacity through the holder member, thus allowing the value of the electrostatic capacity to be easily detected.

Next, the driving apparatus for the optical recording medium according to the present invention is equipped, as stated in claim 5, with the following optical head. The optical head includes a holder member for retaining an optical means having the function of an objective lens focusing a laser beam to irradiate an optical recording medium and an optical means having the function of a solid immersion lens disposed between the objective lens and the optical recording medium while keeping fixed the distance between the objective lens and the solid immersion lens, and a moving mechanism for moving the holder member in a direction along an optical axis of the laser beam, wherein an electrically conductive material is used on a surface of the optical head facing the optical recording medium. At the same time, the apparatus is also equipped with a signal processing means that produces a control signal for controlling the distance between the solid immersion lens and the optical recording medium as measured in the optical-axial direction, according to the electrostatic capacity formed by this electrically conductive material and this optical recording medium, wherein the holder member is moved by means of the moving mechanism according to the control signal.

In this driving apparatus for an optical recording medium there are provided not only the optical head as stated in claim 1, but also the signal processing means for producing a control signal that controls the distance between the solid immersion lens and the optical recording medium according to the electrostatic capacity formed in that optical head. By moving the holder member with the moving mechanism according to the control signal, the air gap is controlled with high accuracy and simultaneously the objective lens to optical disc distance is also controlled with high accuracy. Therefore, the focus servo is realized.

In this way, according to the driving apparatus for an optical recording medium, it is possible to make the numerical aperture large by means of the solid immersion lens. In addition, it is possible to make control with high precision for making the air gap sufficiently small according to the electrostatic capacity. Furthermore, it is possible to realize the focus servo with a single moving mechanism and a sort of signal processing based on the electrostatic capacity. Thus, the moving mechanism and signal processing for use in the focus servo can be made to be simpler.

Additionally, this signal processing means of the driving apparatus for an optical recording medium may be arranged, for example, as stated in claim 6, to have a means for generating a signal, either of the frequency or the phase of which changes depending on a change in the electrostatic capacity, a means for generating a predetermined reference signal, and a means for producing a control signal by comparing either of the frequency or phase of the above signal with that of the reference signal.

BEST MODE FOR CARRYING OUT THE INVENTION

In the following description, an explanation will be given of an example in which the present invention is applied to a driving apparatus for a phase-change type optical disc.

Figure 3:
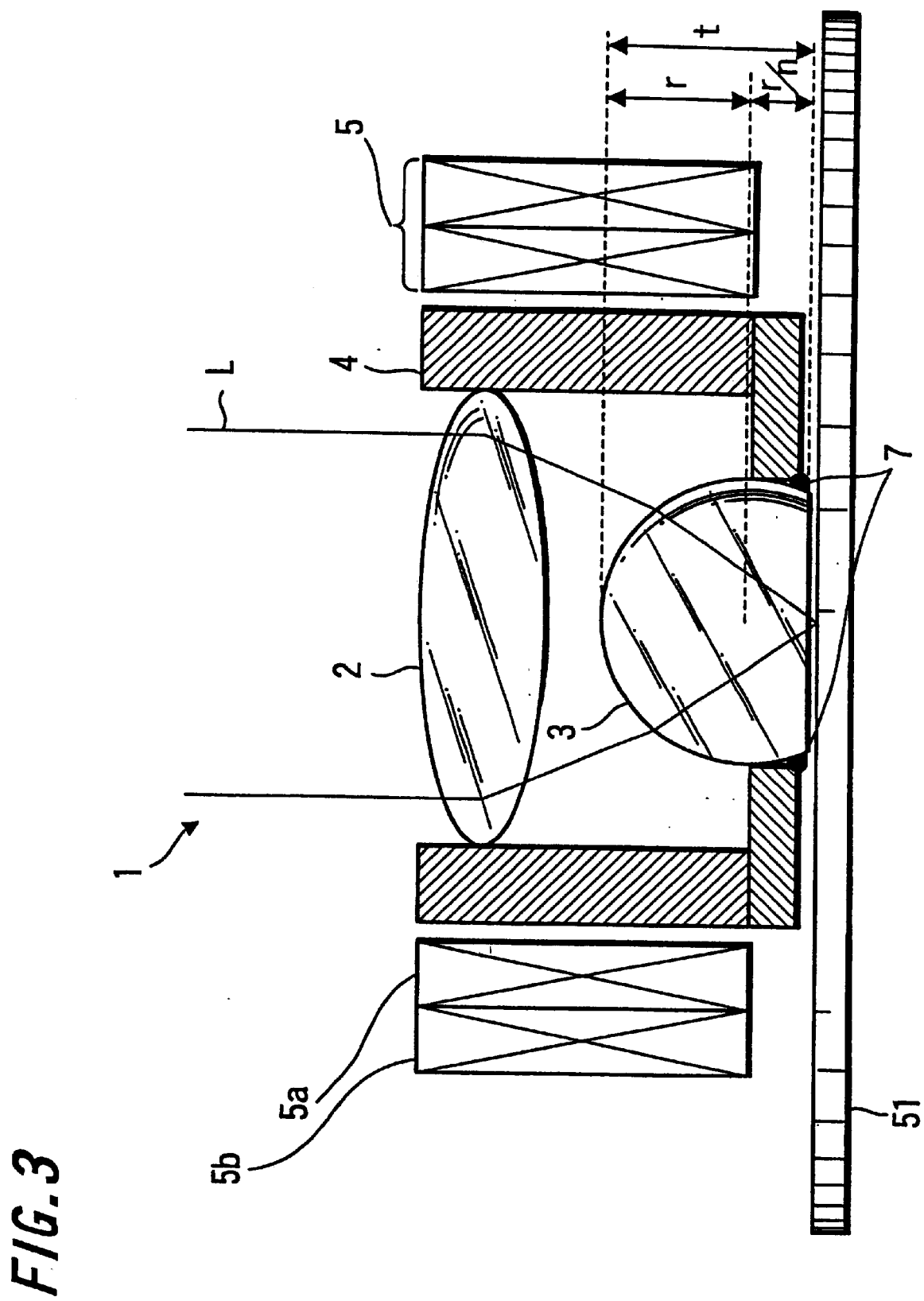
FIG. 3 is a side view, partly in section, of an example of the structure of an optical head according to the present invention.

FIG. 3 illustrates an example of the construction of an optical head fixed in an optical pick-up of this optical-disc-driving apparatus.

This optical head 1 comprises an objective lens 2 for focusing a laser beam L to irradiate a phase-change type optical disc 51 mounted on the disc-driving apparatus, a solid immersion lens (SIL) 3 that is disposed between the optical disc 51 and the objective lens 2, a lens holder 4 that integrally holds these lenses 2 and 3, and an electromagnetic actuator 5 for moving this lens holder 4 (a focus actuator 5a for moving in the optical-axial direction of the lenses 2 and 3 and a tracking actuator 5b for moving in a direction along the disc surface of the optical disc 51).

In this way, the objective lens 2 and the SIL 3 are integrally held by one lens holder 4, and this lens holder 4 is moved by one focus actuator 5a in the direction along the optical axis. It is thus arranged that the objective lens 2 and the SIL 3 are moved by one focus actuator 5a in the optical-axial direction as the distance therebetween is kept fixed.

The SIL 3 has a shape in which a part of a spherical lens is cut away (It is generally called "Super Sphere SIL" or "Hyper Sphere SIL"). In this SIL 3, the spherical surface is made to face the objective lens 2 and the surface opposite to the spherical surface (hereinafter called "a bottom surface") is made to face the optical disc 51. In this condition the SIL 3 is held by the lens holder 4.

This SIL 3 is designed so as to focus the laser beam L without aberration (to satisfy the stigmatic focusing conditions). Assuming that r represents the radius of the spherical lens and n represents the refractive index of the spherical surface, the thickness t of the SIL 3 as measured in the optical-axial direction is determined using the following expression (2).

$$t = r(1 + 1/n) \qquad (2)$$

In the reference literature no. 2 above referred to, it is reported that the numerical aperture of a lens group consisting of the objective lens 2 and the SIL 3 (the effective numerical aperture) $NA_{eff}$ is found from the numerical aperture of the objective lens 2 $NA_{obj}$ and the refractive index n by the following expression (3).

$$NA_{eff} = n^2 \cdot NA_{obj} \qquad (3)$$

Figure 1A:
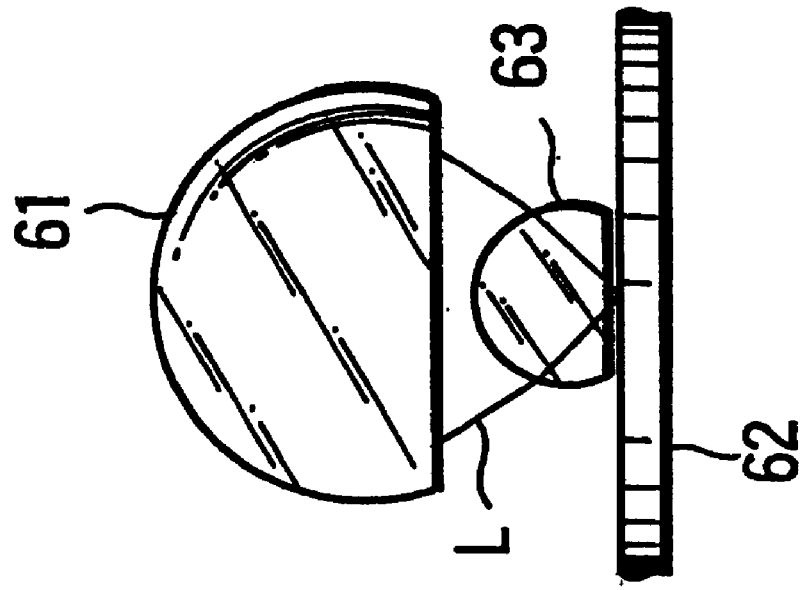
FIGS. 1A and 1B are diagrams illustrating the principle according to which the numerical aperture is increased with a SIL.
Figure 1B:
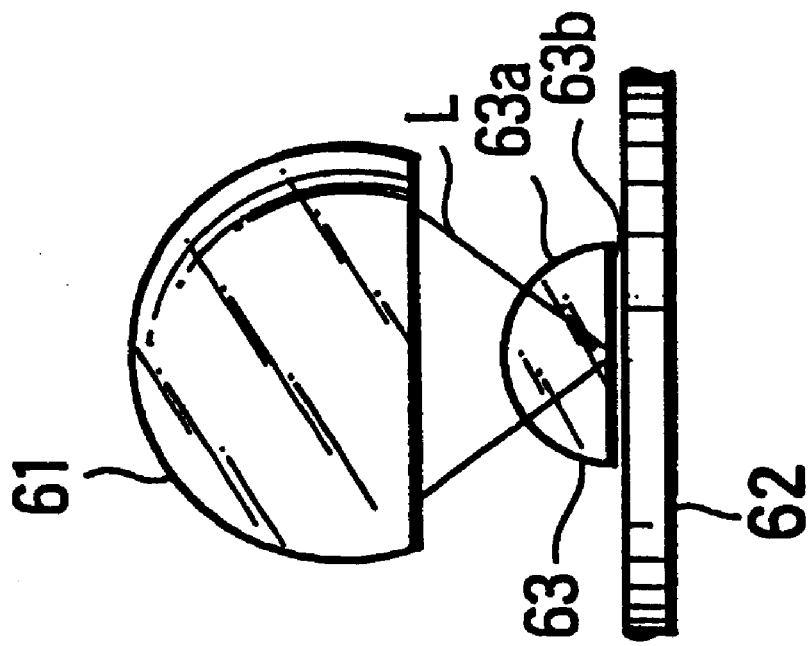
Figure 2:
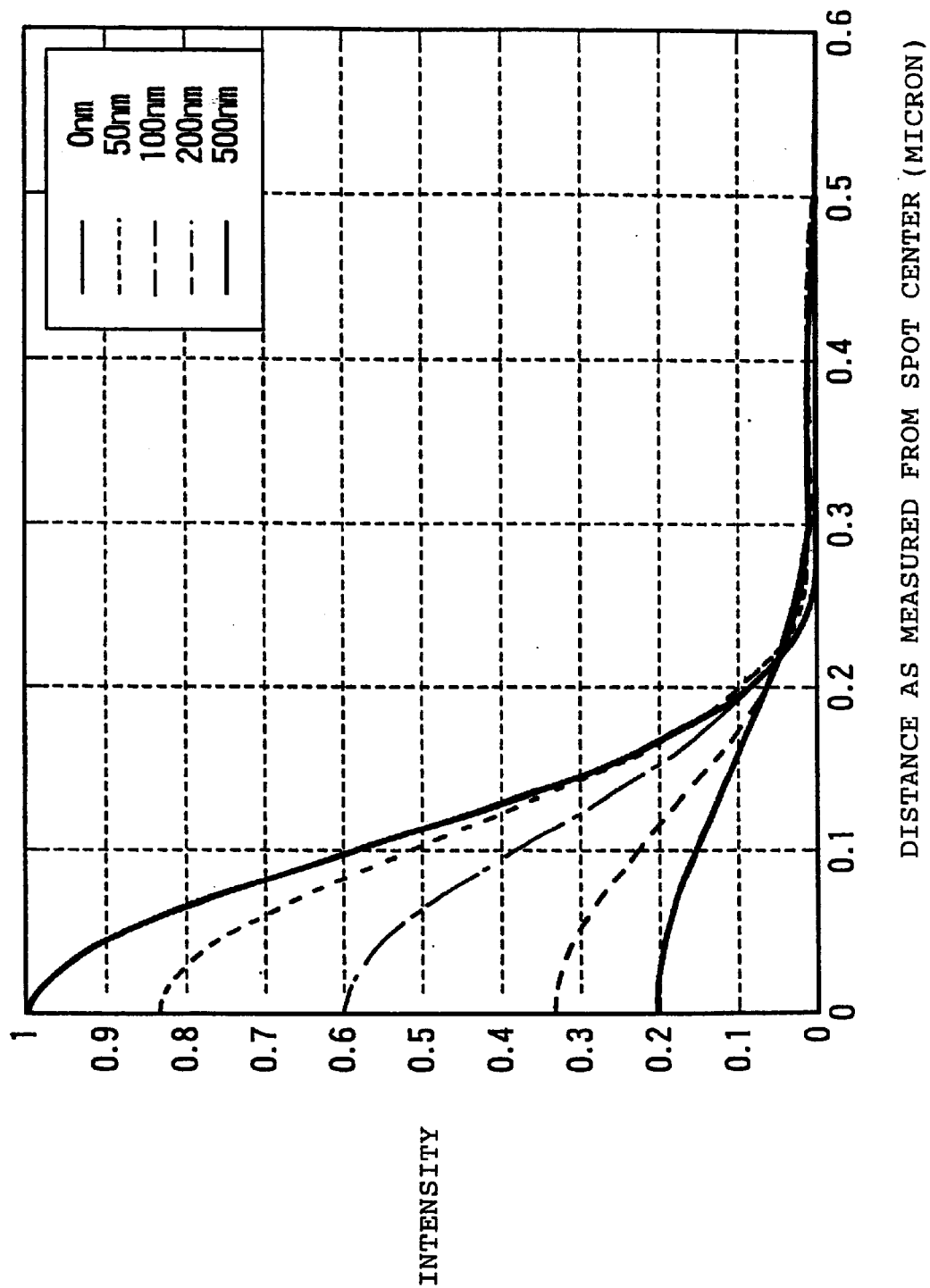
FIG. 2 is a graphic diagram illustrating the intensity distribution of a laser beam on an optical disc when the numerical aperture exceeds 1.

By way of example, a lens having a numerical aperture $NA_{obj} = 0.45$ is herein used as the objective lens 2 and a lens having a refractive index n=1.83 is used as the SIL 3. Accordingly, from the expression (3) the $NA_{eff}$ becomes approximately 1.5. Therefore, when the wavelength of the laser beam L is, for example, 640 nm, for the reason that has been explained using FIG. 2, the SIL 3 to optical disc 51 distance (air gap) as measured in the optical-axial direction of the laser beam L needs to be controlled within 100 nm even at maximum. preferably to 50 nm or so.

Figure 4:
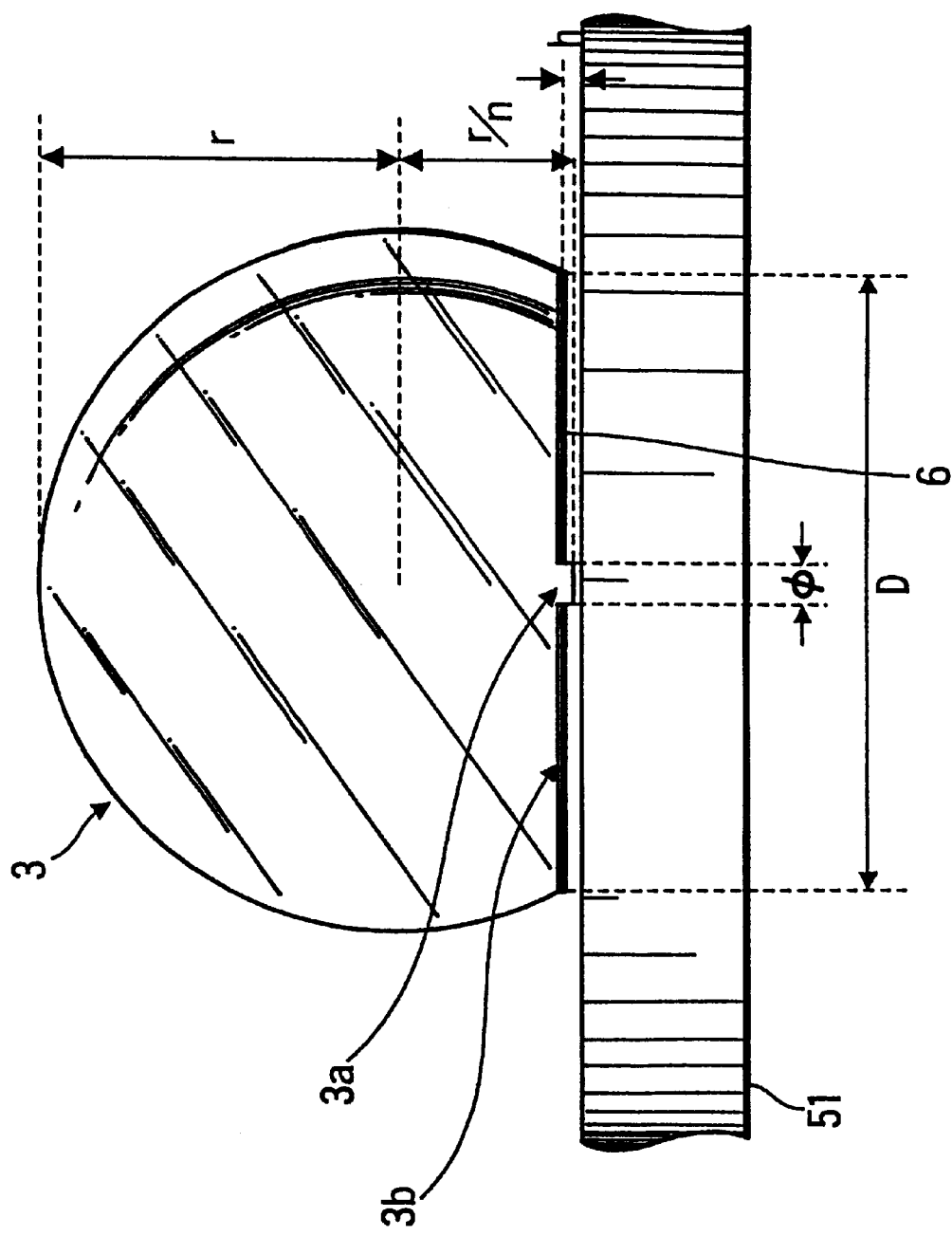
FIG. 4 is a side view illustrating a detailed example of the structure of a bottom surface of the SIL of FIG. 3.

FIG. 4 illustrates a detailed example of the structure of the bottom surface of the SIL 3 of FIG. 3. This bottom surface has a diameter D of 1.5 mm and its central portion 3a is caused to protrude. Its peripheral portion 3b is made flat. The width φ and the height of the central portion 3a are about 40 μm and 2 μm, respectively.

On the peripheral portion 3b there is formed a film 6 made of electrically conductive material (by way of example, this is made to be aluminum) so as to be sufficiently thinner than the height of the protrusion of the central portion 3a. As a result of this structure, an electrostatic capacity is formed between the aluminum film 6 and the aluminum-made reflection plane of the optical disc 51.

The value C of this electrostatic capacity is found, on the assumption that S represents an area of a surface where the peripheral portion 3b and the optical disc 51 are opposite to each other and h represents the distance between the aluminum film 6 and the optical disc 51, from the following expression (4).

$$C = \epsilon_0 \cdot \epsilon_r \cdot S/h \qquad (4)$$

where $\epsilon_0$ represents the vacuum dielectric constant (8.854× $10^{-12}$ (F/m); and $\epsilon_r$ represents the relative dielectric constant (approximately 1 within the air).

Since the diameter D of the bottom surface of the SIL 3 is 1.5 mm as mentioned above, the area S becomes approximately $1.766 \times 10^{-6} m^2$. When the central portion 3a is in contact with the optical disc 51 (when the air gap is 0), the distance h has a minimum value of approximately 2 μm. When the air gap is 50 nm, 100 nm, and 200 nm, the distance h has values of about 2.05 μm, 2.1 μm, and 2.2 μm, respectively.

Accordingly, when the air gap is 0, 50 nm, 100 nm and 200 nm, the values C of the resulting electrostatic capacities are found from the expression (4) to be 7.82 pF, 7.63 pF, 7.45 pF, and 7.11 pF, respectively.

As illustrated in FIG. 3, this aluminum film 6 is joined to the lens holder 4 by a solder 7. The lens holder 4 is made of an electrically conductive material (It is herein, e.g. aluminum). It is thus arranged that a voltage signal indicating the value C of the electrostatic capacity can be taken out from the lens holder 4 (i.e, the value C of the electrostatic capacity can be detected through the lens holder 4).

Figure 5:
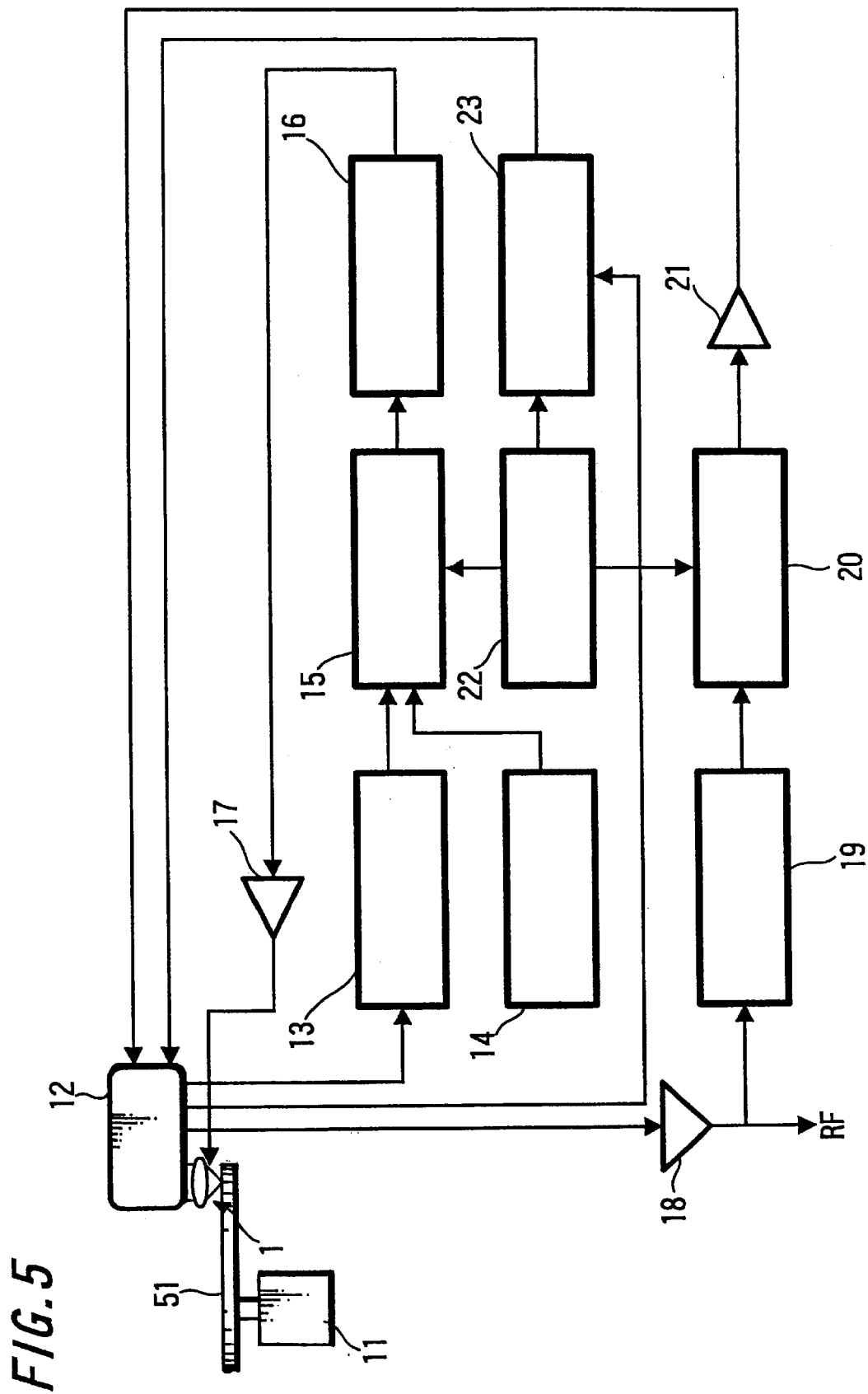
FIG. 5 is a block diagram illustrating an example of the construction of a servo signal processing system of a driving apparatus for an optical disc according to the present invention.

Next, FIG. 5 illustrates an example of the construction of a focus servo and tracking servo signal processing system of an optical disc driving apparatus in which the optical head 1 of FIG. 3 is fixed in an optical pick-up.

The optical disc 51 mounted on this optical disc driving apparatus is driven to rotate by a spindle motor 11 on the CAV (constant-angular-velocity recording) system.

By a laser beam with a wavelength of 640 nm being made to irradiate this optical disc 51 through the operations of the optical pick-up 12 and the optical head 1 as described below information is recorded onto and reproduced from the optical disc 51.

The signal processing system for use in the focus servo operation is constructed as follows.

The voltage signal indicating the value C of the electrostatic capacity, which has been taken out from the lens holder 4 (FIG. 3) of the optical head 1, is supplied to a VCO (voltage-controlled oscillator) 13.

The VCO 13 consists of a LC oscillator and outputs a signal having an oscillation frequency f as is given in the following expression (5) according to the value C of the electrostatic capacity indicated by the voltage signal and the inductance L having a fixed value inside the VCO 13.

$$f = 1/2\pi\sqrt{LC} \qquad (5)$$

where, by way of example, it is assumed that the inductance L inside the VCO 13 is equal to 100 μH.

When the air gap is 0, 50 nm, 100 nm, and 200 nm, the values C of the electrostatic capacities respectively become 7.82 pF, 7.63 pF, 7.45 pF and 7.11 pF from the expression (4), respectively. Accordingly, the corresponding oscillation frequencies f of the VCO 13 become 5.69 MHz, 5.76 MHz 5.83 MHz and 5.97 MHz from the expression (5), respectively.

The output signal of the VCO 13, along with a signal having a reference frequency of 5.76 MHz (namely, the frequency equal to the oscillation frequency f of the VCO 13 output when the air gap is 50 nm), which is output from a VCXO (voltage-controlled oscillator) 14, is supplied to a PLL (phase-locked loop) 15 serving as a frequency/phase comparator.

The PLL 15 compares the frequency and phase of the output signal of the VCO 13 and those of the output signal of the VCXO 14 and outputs a signal corresponding to the error between the output both signals with respect to the frequency and phase.

The output signal of the PLL 15 is phase-compensated by a phase compensator circuit 16 and then is amplified by an amplifier 17. Thereafter, the resulting signal is supplied to the focus actuator 5a of the electromagnetic actuator 5 of the optical head 1 as a control signal for controlling the air gap.

The focus actuator 5a moves the lens holder 4 in the optical-axial direction according to this control signal. This makes the air gap controlled to be 50 nm and also the distance between the objective lens 3 and the optical disc 51 is also controlled to be fixed. Thus, the focus servo is realized.

On the other hand, the signal processing system used for the tracking servo operation is constructed as follows.

Figure 6:
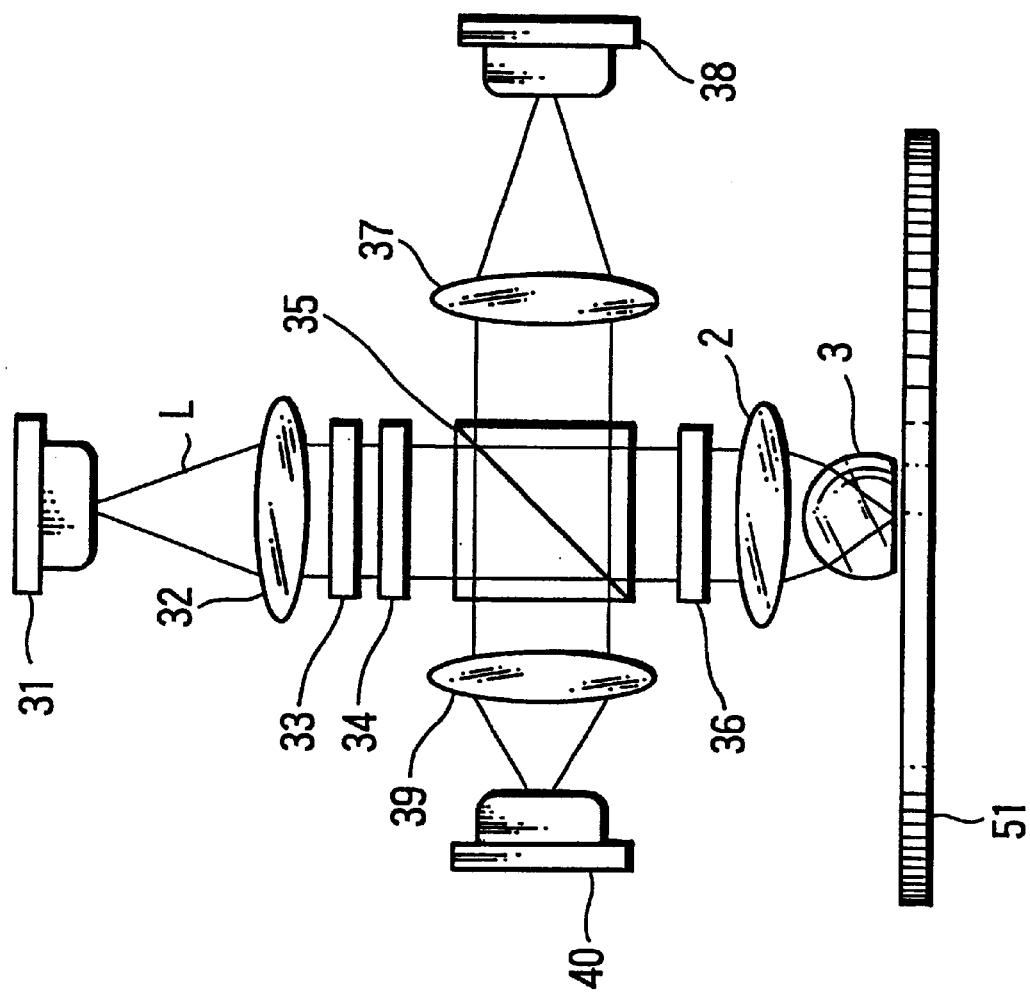
FIG. 6 is a diagram illustrating an example of the structure of an optical pick-up of FIG. 5. And, FIG. 7 is a diagram illustrating an example of the disposition of light receiving elements on a photo-detector 38 of FIG. 6.

FIG. 6 illustrates an example of the structure of the optical pick-up 12. A linearly polarized laser beam L having a wavelength of 640 nm, which is emitted from a semiconductor laser 31, is made to be a parallel light by a collimator lens 32. The parallel light is separated by a diffraction grating 33 into a main beam (the 0th order light) and side beams (the ±1st order lights) and its plane of polarization is rotated by a ½-wavelength plate 34. Then, the resulting beam enters a polarized-beam splitter 35.

Most of this incoming beam passes through the polarized-beam splitter 35 and is made to be a circularly polarized light by a ¼-wavelength plate 36. The resulting beam is focused by the objective lens 2 and the SIL 3 (FIG. 3) of the optical head 1 and irradiates a signal recording surface of the optical disc 51.

Additionally, part of the incoming beam is reflected by the polarized-beam splitter 35 and then passes through a condenser lens 39 enter a photo-detector 40 for monitoring the intensity of the laser beam.

The laser beam reflected by the signal-recording surface of the optical disc 51 passes through the optical head 1 and is made to be a linearly polarized light orthogonal to the original one by the ¼-wavelength plate 36. The resulting light is reflected by the polarized-beam splitter 35 and the reflected light passes through a condenser lens 37 to enter a photo-detector 38 for detecting a tracking error signal and a RF signal.

Figure 7:
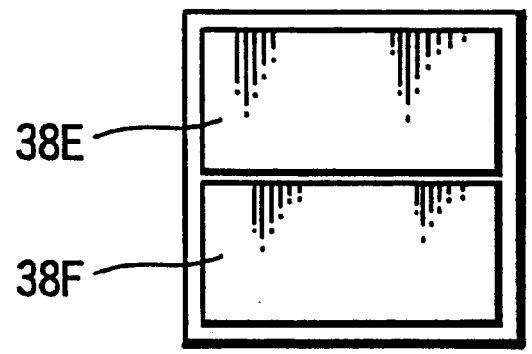
Figure 7:
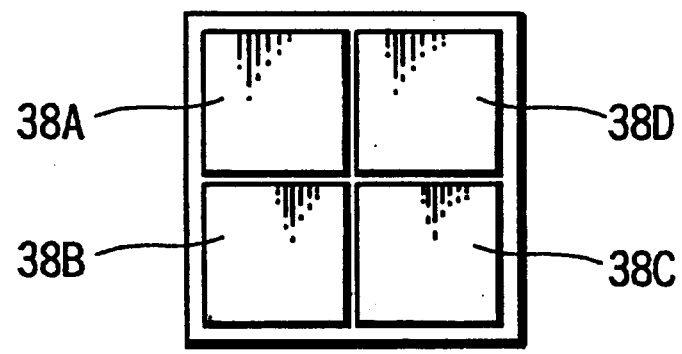
Figure 7:
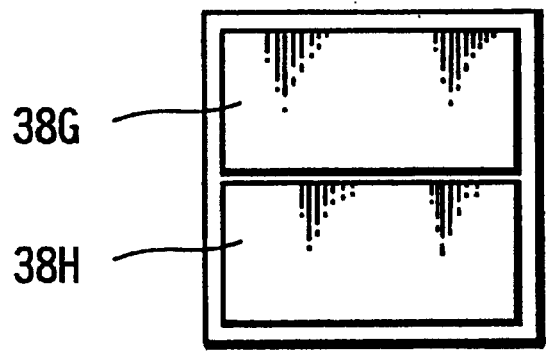

As illustrated in FIG. 7, in the photo-detector 38, there are disposed four-divided light-receiving elements (photodiodes) 38A to 38D for receiving the main beam at a central portion thereof. On both sides thereof, there are disposed two-divided light-receiving elements 38E, 38F and 38G, 38H for receiving the sidebeams. Thus, the photo-detector 38 is a photo-detector that is divided into eight elements.

The output signals A to H of the respective light-receiving elements 38A to 38H of the photo-detector 38 are amplified by a head amplifier 18 and then supplied to a tracking matrix circuit 19 as illustrated in FIG. 5.

The tracking matrix circuit 19 generates a tracking error signal TE by performing the calculation of the following expression (6) according to the output signals A to H.

$$TE=(A+D)-(B+C)+k\cdot\{(E-F)+(G-H)\} \quad (6)$$

where k represents a constant.

Additionally, the output signals A to D of the respective light-receiving elements 38A to 38D of the photo-detector 38 are amplified by a head amplifier 18, and then also supplied to the reproduction signal processing system (not illustrated) of this optical disc driving apparatus. In this reproduction signal processing system, a reproduction RF signal RF is generated by performing the calculation of the following expression (7).

$$RF=A+B+C+D \quad (7)$$

The tracking error signal TE is phase-compensated by a phase compensator 20, amplified by an amplifier 21, and then supplied to the tracking actuator 5b of the electromagnetic actuator 5 of the optical head 1.

The tracking actuator 5b moves the lens holder 4 according to the tracking error signal TE in a direction along the disc surface of the optical disc 51, thus the tracking servo control being realized.

These focus servo and tracking servo control operations are performed under the control of a CPU 22.

Moreover, the output signal of the photo-detector 40 (FIG. 6) for monitoring the optical pick-up 12 is supplied to an APC (automatic power control) circuit 23, which adjusts, under the control of the CPU 22, the output level of the semiconductor laser 31 (FIG. 6) of the optical pick-up 12 so that the value of the output signal of the photo-detector 40 may coincide with a predetermined reference value (there are two reference values therefor, one being for the recording mode and the other being for the reproduction mode).

As described above, according to this optical disc driving apparatus, as a result of using the solid immersion lens, the numerical aperture is made to be approximately 1.5 and besides, control of the air gap to 50 nm (size allowing no fall in the intensity of the laser beam irradiating the signal-recording surface of the optical disc 51) is performed according to the electrostatic capacity with high precision.

Furthermore, according to this optical disc driving apparatus, because the focus servo is realized with a single focus actuator 5a (FIG. 3), compared to the case where two focus actuators are needed, one being for moving the holder retaining the solid immersion lens and the other being for moving the holder retaining the objective lens, the focus actuator is further simplified.

Also, because the focus servo is realized through a single signal processing system from the VCO 13 based on the electrostatic capacity to amplifier 17 (FIG. 5), compared to the case where two signal processing, one being systems are required for the focus servo, for generating a control signal for controlling the air gap according to the electrostatic capacity and the other being for generating a control signal for controlling the distance between the objective lens and the optical disc (e.g. the matrix processing of the output signal of the photo-detector which receives the laser beam reflected by the optical disc), the signal processing for the focus servo is further simplified.

Moreover, as illustrated in FIG. 4, because there is formed the electrostatic capacity between the SIL 3 itself and the optical disc 51 by forming the aluminum film 6 on the bottom surface of the SIL 3, compared to the case where the electrostatic capacity is formed, for example, between the lens holder 4 and the optical disc 51, the value C of the electrostatic capacity is made larger due to the reduction in the distance between the aluminum film 6 and the optical disc 51. Therefore, it is possible to produce the control signal for the focus servo according to the electrostatic capacity with higher precision.

Furthermore, because the central portion 3a of the bottom surface of the SIL 3 is made into the protrusion and, on the peripheral portion 3b thereof, the aluminum film 6 is formed thinner than the height of this protrusion, when the air gap is controlled using the central portion 3a as a reference, there is no possibility that the aluminum film 6 will approach the optical disc 51 closer than o the central portion 3a does to contact with the optical disc 51.

In addition, because the central portion 3a of the bottom surface of the SIL 3 protrudes, the remaining portion of the optical head 1 is retreated from the optical disc 51 accordingly. Therefore, even when the entire optical head 1 is inclined with respect to the optical disc 51, there is less possibility that the optical head 1 will contact with the optical disc 51.

Also, as illustrated in FIG. 3, because it is arranged that the value C of the electrostatic capacity can be detected through the lens holder 4 by electrically connecting the aluminum film 6 to the aluminum-made lens holder 4, the value C of the electrostatic capacity can easily be detected.

Additionally, in the above example, the optical head 1 is provided with two lenses of the objective lens 2 and the SIL 3 as the optical means having the function of an objective lens for focusing the laser beam to irradiate the optical disc and the optical means having the function of a solid immersion lens disposed between the objective lens and the optical disc.

However, the present invention is not limited there to. For instance, it may be arranged that the optical head is provided with a single optical element that has both of the function of an objective lens and the function of a solid immersion lens.

As such a single optical element, for example, there can be cited a reflection type light condensing element that is described in the Chul Woo Lee et al's thesis entitled "Feasibility study on near field optical memory using a catadioptric optical system", carried on pages 137 to 139 of "Digest of Optical Data Storage" published by Aspen company in 1998.

Alternatively, as the optical means having the function of an objective lens and the optical means having the function of a solid immersion lens, three or more optical elements may be provided in the optical head or a hologram element may be provided in the optical head.

Also, in the above example, the present invention is applied to the driving apparatus for a phase-change type optical disc. However, the present invention may be also applied to a driving apparatus for a magneto-optical disc, a driving apparatus for an optical disc dedicated to reproduction only, or a driving apparatus for an optical recording medium (e.g. an optical card) other than the optical disc.

The present invention is not limited to the above-described example and of course permits other various constructions can be made without departing from the scope of the invention.

As having described above, according to the optical head of the present invention, the numerical aperture can be made large (e.g. more than 1) by means of the solid immersion lens and besides, the control for making the air gap sufficiently small (e.g. within 100 nm) can be performed according to the electrostatic capacity with high precision. Furthermore, focus servo can be realized with a single moving mechanism (actuator). Therefore, it is possible to further simplify the moving mechanism for performing focus servo.

Moreover, on the side of the focus servo system of the driving apparatus for an optical recording medium, it is also possible to realize focus servo with a single signal processing system based on the electrostatic capacity. This advantageously makes it also possible to further simplify the signal processing for the purpose of executing the focus servo.

In addition, the central portion of a surface of the solid immersion lens facing the optical recording medium is made into a protrusion a peripheral portion around the protrusion being made flat, and on this peripheral portion being formed a film made of an electrically conductive material to form an electrostatic capacity between the solid immersion lens itself and the optical recording medium. When arranged in this manner, compared to the case, e.g. where the electrostatic capacity is formed between the holder member and the optical recording medium, the value of the electrostatic capacity can be made large by making small of the distance between the electrically conductive material and the optical recording medium. Therefore, it advantageously becomes possible to produce the control signal based on the electrostatic capacity with higher precision.

Also, by the extent to which the central portion of this facing surface protrudes, the remaining portion of the optical head is retreated away from the optical recording medium. Therefore, even when the entire optical head has been inclined with respect to the optical recording medium, it advantageously becomes less possible that the optical head will contact with the optical recording medium.

Furthermore, if it is arranged to electrically connect the holder member using an electrically conductive material and the electrically conductive film of the peripheral portion of the solid immersion lens, it is then possible to detect the value of the electrostatic capacity through the holder member. Therefore, it advantageously becomes possible to easily detect the value of the electrostatic capacity.

Next, according to the driving apparatus for an optical recording medium by the present invention, it is possible to make the numerical aperture large with the solid immersion lens and besides, to perform a control for making the air gap sufficiently small according to the electrostatic capacity with high accuracy. Furthermore, it is possible to realize the focus servo with a single moving mechanism and a single signal processing system based on the electrostatic capacity. Therefore, it is advantageously possible to further simplify the moving mechanism and signal processing for the focus servo.

What is claimed is:

1. An optical head comprising
    a holder member for retaining an optical means having the function of an objective lens focusing a laser beam to irradiate an optical recording medium and an optical means having the function of a solid immersion lens disposed between the objective lens and the optical recording medium while keeping a fixed distance between the objective lens and the solid immersion lens, and
    a moving mechanism for moving the holder member in a direction along an optical axis of the laser beam, wherein
    an electrically conductive material is used on a surface of the optical head facing the optical recording medium.

2. The optical head according to claim 1, wherein a surface of the solid immersion lens facing the optical recording medium is caused to protrude at its central portion and its peripheral portion being made flat, and a film made of an electrically conductive base material being formed on the peripheral portion.

3. The optical head according to claim 2, wherein an electrically conductive material is used for the holder member, and the film formed on the peripheral portion is electrically connected to the holder member.

4. The optical head according to any one of claims 1 to 3, wherein the numerical aperture of a lens group consisting of the objective lens and the solid immersion lens exceeds 1.

5. A driving apparatus for an optical recording medium, for driving the optical recording medium to perform either of the recording of information onto the optical recording medium and the reproduction of information from the optical recording medium, comprising
    an optical head including a holder member for retaining an optical means having the function of an objective lens focusing a laser beam to irradiate the optical recording medium and an optical means having the function of a solid immersion lens disposed between the objective lens and the optical recording medium while keeping a fixed distance between the objective lens and the solid immersion lens as well as a moving mechanism for moving the holder member in a direction along an optical axis of the laser beam, in which an electrically conductive material is used on a surface of the optical head facing to the optical recording medium, and
    signal processing means that produces, according to the electrostatic capacity formed by the electrically conductive material and the optical recording medium, a control signal for controlling the distance between the solid immersion lens and the optical recording medium as measured in the optical-axial direction, wherein
    the holder member is moved by the moving mechanism according to the control signal.

6. The driving apparatus for an optical recording medium according to claim 5, wherein the signal processing means includes a means for generating a signal whose frequency or phase changes in accordance with a change of the electrostatic capacity, a means for generating a predetermined reference signal, and a means for producing the control signal by comparing either of the frequency and phase of the signal with that of the reference signal.

7. The driving apparatus for an optical recording medium according to claim 5 or 6, wherein
    the numerical aperture of a lens group consisting of the objective lens and the solid immersion lens exceeds 1, and
    the signal processing means produces a signal for controlling the distance to fall within 100 nm.

* * * * *